US 9,298,747 B2

(12) United States Patent
Shukla et al.

(10) Patent No.: US 9,298,747 B2
(45) Date of Patent: Mar. 29, 2016

(54) DEPLOYABLE, CONSISTENT, AND EXTENSIBLE COMPUTING ENVIRONMENT PLATFORM

(75) Inventors: Dharma Shukla, Sammamish, WA (US); Perraju Bendapudi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1092 days.

(21) Appl. No.: 12/052,556

(22) Filed: Mar. 20, 2008

(65) Prior Publication Data

US 2009/0240698 A1 Sep. 24, 2009

(51) Int. Cl.
*G06F 17/30* (2006.01)

(52) U.S. Cl.
CPC .............................. *G06F 17/30286* (2013.01)

(58) Field of Classification Search
None
See application file for complete search history.

(56) References Cited

U.S. PATENT DOCUMENTS

| | | | |
|---|---|---|---|
| 5,437,025 A | | 7/1995 | Bale et al. |
| 5,504,852 A | | 4/1996 | Thompson-Rohrlich |
| 5,548,726 A | * | 8/1996 | Pettus ............................ 709/221 |
| 5,850,090 A | | 12/1998 | Oashi et al. |
| 5,930,156 A | | 7/1999 | Kennedy |
| 5,983,234 A | * | 11/1999 | Tietjen et al. ........... G06F 17/30 |
| 6,047,312 A | * | 4/2000 | Brooks et al. .................. 709/203 |
| 6,105,062 A | * | 8/2000 | Andrews et al. ............... 709/223 |
| 6,137,493 A | | 10/2000 | Kamimura et al. |
| 6,209,029 B1 | | 3/2001 | Epstein et al. |
| 6,243,746 B1 | | 6/2001 | Sondur et al. |
| 6,286,138 B1 | | 9/2001 | Purcell |
| 6,330,717 B1 | | 12/2001 | Raverdy et al. |
| 6,374,252 B1 | | 4/2002 | Althoff et al. |
| 6,496,979 B1 | | 12/2002 | Chen et al. |
| 6,546,554 B1 | | 4/2003 | Schmidt et al. |
| 6,573,907 B1 | | 6/2003 | Madrane |

(Continued)

FOREIGN PATENT DOCUMENTS

| CN | 1801086 A | 7/2006 |
|---|---|---|
| JP | 2000242541 A | 9/2000 |

(Continued)

OTHER PUBLICATIONS

Non-Final Office Action cited in related U.S. Appl. No. 12/057,000 dated Aug. 4, 2010.

(Continued)

*Primary Examiner* — Son T Hoang
(74) *Attorney, Agent, or Firm* — Bryan Webster; Kate Drakos; Micky Minhas

(57) ABSTRACT

The diverse objects comprising a computing environment may be represented together as a deployable object hierarchy, which may facilitate the deployment, as well as the consistency, of a computing environment rendered by a plurality of devices. The processes within the computing environment often operate on the objects of the object hierarchy in a variety of ways, including simple operations (creation, reading, updating, and deleting) and more sophisticated operations (synchronizing, paginating, and caching), as well as with the object hierarchy in general. A platform may be devised to facilitate the various operations of the processes on the object hierarchy. The platform may be embodied, such as in an application runtime, and deployed to a variety of platforms to facilitate an equivalent execution of the processes on any type of device and consistent interactions with the object hierarchy.

20 Claims, 5 Drawing Sheets

(56) References Cited

U.S. PATENT DOCUMENTS

| | | |
|---|---|---|
| 6,594,664 B1 | 7/2003 | Estrada et al. |
| 6,662,192 B1 | 12/2003 | Rebane |
| 6,678,724 B2 | 1/2004 | Nakajima et al. |
| 6,685,090 B2 | 2/2004 | Nishigaya et al. |
| 6,732,172 B1 | 5/2004 | House et al. |
| 6,836,842 B1 | 12/2004 | Guccione et al. |
| 6,907,451 B1 | 6/2005 | Mukundan et al. |
| 6,909,721 B2 | 6/2005 | Ekberg et al. |
| 6,941,306 B2 | 9/2005 | Kim |
| 6,952,714 B2 | 10/2005 | Peart |
| 6,968,535 B2 | 11/2005 | Stelting et al. |
| 7,013,340 B1 | 3/2006 | Burd et al. |
| 7,054,927 B2 | 5/2006 | Ulrich et al. |
| 7,088,995 B2 | 8/2006 | Rao |
| 7,089,295 B2 | 8/2006 | Christfort et al. |
| 7,099,888 B2 | 8/2006 | Gollapudi et al. |
| 7,117,243 B2 | 10/2006 | Peart |
| 7,117,495 B2 | 10/2006 | Blaser et al. |
| 7,146,524 B2 | 12/2006 | Patel et al. |
| 7,149,959 B1 | 12/2006 | Jones et al. |
| 7,203,485 B2 | 4/2007 | Coppinger et al. |
| 7,240,327 B2 | 7/2007 | Singh et al. |
| 7,266,370 B2 | 9/2007 | Paddon et al. |
| 7,266,563 B2 | 9/2007 | Morris et al. |
| 7,284,196 B2 | 10/2007 | Skeen et al. |
| 7,330,872 B2 | 2/2008 | Peart et al. |
| 7,353,259 B1 | 4/2008 | Bakke et al. |
| 7,406,542 B2 | 7/2008 | Erlingsson |
| 7,483,978 B2 | 1/2009 | Esfahany et al. |
| 7,577,681 B1 | 8/2009 | Rozenman et al. |
| 7,681,134 B1 | 3/2010 | Grechishkin et al. |
| 7,836,458 B1 | 11/2010 | Gwozdz et al. |
| 7,890,543 B2 | 2/2011 | Hunt et al. |
| 8,185,891 B2 | 5/2012 | DeHaan |
| 8,290,762 B2 | 10/2012 | Kodosky et al. |
| 2001/0044801 A1 | 11/2001 | Senn et al. |
| 2002/0010807 A1 | 1/2002 | Multer et al. |
| 2002/0029227 A1 | 3/2002 | Multer et al. |
| 2002/0040368 A1 | 4/2002 | Schreiber |
| 2002/0103811 A1 | 8/2002 | Fankhauser et al. |
| 2002/0133669 A1* | 9/2002 | Devireddy et al. ............ 711/114 |
| 2002/0138617 A1 | 9/2002 | Christfort et al. |
| 2002/0194045 A1* | 12/2002 | Shay et al. ................. 705/8 |
| 2003/0004746 A1 | 1/2003 | Kheirolomoom et al. |
| 2003/0033308 A1 | 2/2003 | Patel et al. |
| 2003/0063134 A1 | 4/2003 | Lord et al. |
| 2003/0071857 A1* | 4/2003 | Arrouye et al. ............ 345/853 |
| 2003/0074393 A1 | 4/2003 | Peart |
| 2003/0177121 A1 | 9/2003 | Moona et al. |
| 2003/0233376 A1 | 12/2003 | Bussler et al. |
| 2003/0233383 A1 | 12/2003 | Koskimies |
| 2003/0236917 A1* | 12/2003 | Gibbs et al. ............ 709/248 |
| 2004/0006566 A1 | 1/2004 | Taylor et al. |
| 2004/0031029 A1 | 2/2004 | Lee et al. |
| 2004/0085947 A1 | 5/2004 | Ekberg et al. |
| 2004/0103071 A1 | 5/2004 | Kalia et al. |
| 2004/0111515 A1 | 6/2004 | Manion et al. |
| 2004/0122792 A1 | 6/2004 | Salazar |
| 2004/0133589 A1 | 7/2004 | Kiessig et al. |
| 2004/0148525 A1 | 7/2004 | Aida et al. |
| 2004/0153568 A1 | 8/2004 | Ho et al. |
| 2004/0199572 A1 | 10/2004 | Hunt et al. |
| 2004/0201604 A1 | 10/2004 | Kraenzel et al. |
| 2004/0236801 A1 | 11/2004 | Borden et al. |
| 2004/0251568 A1 | 12/2004 | Chao et al. |
| 2005/0004978 A1* | 1/2005 | Reed et al. ............ 709/203 |
| 2005/0004985 A1 | 1/2005 | Stochosky |
| 2005/0021847 A1 | 1/2005 | Rothman et al. |
| 2005/0060315 A1 | 3/2005 | Sanin |
| 2005/0060581 A1 | 3/2005 | Chebolu et al. |
| 2005/0062581 A1 | 3/2005 | Koyama |
| 2005/0089965 A1 | 4/2005 | Walke et al. |
| 2005/0091575 A1* | 4/2005 | Relyea et al. ............ 715/502 |
| 2005/0102678 A1 | 5/2005 | Hunt et al. |
| 2005/0125771 A1 | 6/2005 | Vitanov et al. |
| 2005/0138156 A1 | 6/2005 | Gebhart et al. |
| 2005/0177600 A1 | 8/2005 | Eilam et al. |
| 2005/0192962 A1 | 9/2005 | Furrer et al. |
| 2005/0203931 A1 | 9/2005 | Pingree et al. |
| 2005/0251786 A1 | 11/2005 | Citron et al. |
| 2005/0251812 A1 | 11/2005 | Hayward |
| 2005/0289454 A1 | 12/2005 | Donelson et al. |
| 2006/0015538 A1 | 1/2006 | LeTourneau |
| 2006/0015936 A1 | 1/2006 | Illowsky et al. |
| 2006/0036602 A1 | 2/2006 | Unangst et al. |
| 2006/0037007 A1 | 2/2006 | Snyder et al. |
| 2006/0080353 A1 | 4/2006 | Miloushev et al. |
| 2006/0089965 A1 | 4/2006 | Fontes et al. |
| 2006/0117073 A1 | 6/2006 | Bosworth et al. |
| 2006/0123010 A1 | 6/2006 | Landry et al. |
| 2006/0129972 A1 | 6/2006 | Tyburski et al. |
| 2006/0130050 A1 | 6/2006 | Betts et al. |
| 2006/0143435 A1 | 6/2006 | Kwon |
| 2006/0143601 A1 | 6/2006 | Concha et al. |
| 2006/0206533 A1 | 9/2006 | MacLaurin et al. |
| 2006/0224632 A1* | 10/2006 | Franz ....................... 707/104.1 |
| 2006/0253849 A1 | 11/2006 | Avram et al. |
| 2007/0005613 A1 | 1/2007 | Singh et al. |
| 2007/0028175 A1 | 2/2007 | Moore et al. |
| 2007/0038642 A1 | 2/2007 | Durgin et al. |
| 2007/0061349 A1 | 3/2007 | Morgan et al. |
| 2007/0073770 A1 | 3/2007 | Morris et al. |
| 2007/0100834 A1 | 5/2007 | Landry et al. |
| 2007/0106650 A1 | 5/2007 | Moore |
| 2007/0118560 A1 | 5/2007 | Bornhoevd et al. |
| 2007/0150480 A1 | 6/2007 | Hwang et al. |
| 2007/0156842 A1 | 7/2007 | Vermeulen et al. |
| 2007/0169049 A1 | 7/2007 | Gingell et al. |
| 2007/0180043 A1 | 8/2007 | Vernal et al. |
| 2007/0209066 A1 | 9/2007 | Timmerman |
| 2007/0266136 A1 | 11/2007 | Esfahany et al. |
| 2007/0280165 A1 | 12/2007 | Doshi et al. |
| 2007/0294366 A1 | 12/2007 | Ozzie et al. |
| 2008/0016505 A1 | 1/2008 | Bucklew et al. |
| 2008/0040511 A1 | 2/2008 | Messer et al. |
| 2008/0057992 A1 | 3/2008 | Griffin |
| 2008/0059912 A1 | 3/2008 | Scherpa et al. |
| 2008/0092109 A1 | 4/2008 | Kinnucan et al. |
| 2008/0130639 A1 | 6/2008 | Costa-Requena et al. |
| 2008/0147716 A1* | 6/2008 | Omoigui ....................... 707/102 |
| 2008/0155523 A1 | 6/2008 | Kornmann |
| 2008/0201453 A1 | 8/2008 | Assenmacher |
| 2008/0249994 A1 | 10/2008 | Passmore |
| 2008/0276181 A1 | 11/2008 | Moromisato et al. |
| 2009/0083425 A1 | 3/2009 | Bozak et al. |
| 2009/0164987 A1 | 6/2009 | Scholz et al. |
| 2009/0210421 A1 | 8/2009 | Sheehan |
| 2009/0240698 A1 | 9/2009 | Shukla et al. |
| 2009/0240935 A1 | 9/2009 | Shukla |

FOREIGN PATENT DOCUMENTS

| | | |
|---|---|---|
| JP | 2002229902 A | 8/2002 |
| WO | WO 2005/072114 | 8/2005 |
| WO | 2007082005 A2 | 7/2007 |
| WO | 2007083299 A2 | 7/2007 |
| WO | 2008/018051 A2 | 2/2008 |

OTHER PUBLICATIONS

International Search Report cited in related PCT Application No. PCT/US2009/034601 dated Aug. 24, 2009.

Non-Final Office Action cited in related U.S. Appl. No. 12/052,554 dated Aug. 5, 2010.

Restriction/Election cited in related U.S. Appl. No. 11/744,777 dated Dec. 1, 2009.

Notice of Allowance cited in related U.S. Appl. No. 11/744,777 dated Aug. 17, 2010.

U.S. Appl. No. 12/052,534, filed Mar. 20, 2008, Shukla.

U.S. Appl. No. 12/052,550, filed Mar. 20, 2008, Amiga et al.

U.S. Appl. No. 12/052,554, filed Mar. 20, 2008, Shukla et al.

Amazon Simple Storage Service (Amazon S3), http://www.amazon.com/gp/browse.html?node=16427261.

(56) References Cited

OTHER PUBLICATIONS

Foley, "Can Microsoft's 'Harmonica' Create P2P Harmony Across All Devices?" Dated: Dec. 18, 2006, pp. 1-2, http://blogs.zdnet.com/microsoft/?p=157.
"Google Data APIs Overview", http://code.google.com/apis/gdata/overview.html.
Hejtmanek, "Distributed Data Storage Based on Web Access and IBP Infrastructure", In Data Processing and Storage Networking: Towards Grid Computing, Technical Proceedings. : The Third IFIP-TC6 Networking Conference, 2004, Athens, Greece, Dated: May 14, 2004, pp. 1-8.
Miller, "PCI Express and Advanced Switching: Data Movement Protocols", COTS Journal, Dated: Oct. 2003, pp. 76-79.
Sollins et al. "Linking in a Global Information Architecture", pp. 1-18, http://www.ana.ics.mit.edu/people/sollins/links.html.
"Synchronizing Data between WinFS Stores", http://blogs.msdn.com/winfs/archive/2006/01/25/517674.aspx.
Vaas, "Microsoft Aims to Mesh Disparate Calendars, Contacts", Dated: Nov. 21, 2005, pp. 1-4, http://www.eweek.com/c/a/Messaging-and-Collaboration/Microsoft-Aims-to_Mesh-Disparate-Calendars-Contacts/.
Verisign "VeriSign Unified Authentication Service", pp. 1-3.
Peisheng Zhao et al., "Grid Metadata Catalog Service-Based OGC Web Registry Service", Proceedings of the 12th Annual ACM International Workshop on Geographic Information Systems, 2004.
Efstratios Valavanis et al., "MobiShare: Sharing Context-Dependent Data & Services from Mobile Sources", Proceedings, IEEE/WIC International conference on Web Intelligence, 2003. WI 2003.
Wolfgang Hoschek et al., "Grid Enabled Relational Database Middleware", Informational document, Global Grid Forum, Oct. 2001.
International Search Report from related PCT Application No. PCT/US2008/062191 dated Oct. 21, 2008.
Non-final Office Action from U.S. Appl. No. 11/744,777 dated Mar. 10, 2010.
International Search Report from related PCT Application No. PCT/US2009/034601 dated Aug. 24, 2009.
International Search Report from related PCT Application No. PCT/US2009/034442 dated Feb. 19, 2009.
International Search Report from related PCT Application No. PCT/US2009/035602 dated Oct. 1, 2009.
Nathan et al., "Convert XML to JSON in PHP", dated Jan. 16, 2007, pp. 1-10. http://www.ibm.com/developerworks/xml/library/x-xml2jsonphp/.
"Mapping Between JSON and XML", http://msdn2.microsoft.com/en-us/library/bb924435.aspx.
Communication from related EP Application No. 08747323.7-1225 dated Dec. 14, 2009.
Mukhi, et al., "Multi-Protocol Web Services for Enterprises and the Grid", Proc. of EuroWeb 2002 Conference: The Web and the Grid: From e-science to e-business, Oxford, UK, Dated: Dec. 2002, pp. 1-10.
Gribble, et al., "The Ninja Architecture for Robust Internet-Scale Systems and Services", Computer Networks: The International Journal of Computer and Telecommunications Networking, vol. 35, No. 4, Dated: Mar. 2001, pp. 473-497.
Han, et al., "WebSplitter: A Unified XML Framework for Multi-Device Collaborative Web Browsing", Computer Supported Cooperative Work, Proceedings of the 2000 ACM conference on Computer supported cooperative work, US, Year of Publication: 2000, pp. 221-230.
Chen, et al., "Providing Web Services to Mobile Users: the Architecture Design of an M-Service Portal", International Journal of Mobile Communications 2005—vol. 3, No. 1, pp. 1-18.
Bickmore, et al., "Digestor: Device-independent Access to the World Wide Web", Computer Networks and ISDN Systems, vol. 29 , Issue 8-13 (Sep. 1997), Year of Publication: 1997, pp. 1075-1082.
Reply to Non-Final Office Action cited in U.S. Appl. No. 11/744,777 dated Jun. 10, 2010, 15 pgs.
Reply to Restriction/Eloection cited in U.S. Appl. No. 11/744,777 dated Dec. 22, 2009, 10 pgs.
Non-Final Office Action cited in U.S. Appl. No. 12/052,534 dated May 25, 2011, 32 pgs.
Reply to Non-Final Office Action cited in U.S. Appl. No. 12/052,534 dated Jun. 30, 2011, 20 pgs.
Final Office Action cited in U.S. Appl. No. 12/052,534 dated Aug. 16, 2011, 20 pgs.
Reply to Final Office Action cited in U.S. Appl. No. 12/052,534 dated Nov. 16, 2011, 18 pgs.
Non-Final Office Action cited in U.S. Appl. No. 12/052,550 dated Aug. 8, 2011, 21 pgs.
Reply to Non-Final Office Action cited in U.S. Appl. No. 12/052,550 dated Jan. 18, 2011, 18 pgs.
Final Office Action cited in U.S. Appl. No. 12/052,550 dated Mar. 2, 2012, 30 pgs.
Reply to Final Office Action cited in U.S. Appl. No. 12/052,550 dated Sep. 4, 2012, 22 pgs.
Non-Final Office Action cited in U.S. Appl. No. 12/052,550 dated Dec. 21, 2012, 57 pgs.
Reply to Non-Final Office Action cited in U.S. Appl. No. 12/052,554 dated Nov. 4, 2010, 25 pgs.
Final Office Action cited in U.S. Appl. No. 12/052,554 dated Jan. 25, 2011, 43 pgs.
Reply to Final Office Action cited in U.S. Appl. No. 12/052,554 dated Apr. 7, 2011, 31 pgs.
Final Office Action cited in U.S. Appl. No. 12/052,554 dated Mar. 30, 2012, 44 pgs.
Amendment after Final cited in U.S. Appl. No. 12/052,554 dated Jul. 2, 2012, 16 pgs.
Notice of Allowance cited in U.S. Appl. No. 12/052,554 dated Aug. 6, 2012, 22 pgs.
Reply to Non-Final Office Action cited in U.S. Appl. No. 12/057,000 dated Nov. 4, 2010, 19 pgs.
Final Office Action cited in U.S. Appl. No. 12/057,000 dated Jan. 21, 2011, 22 pgs.
Reply to Final Office Action cited in U.S. Appl. No. 12/057,000 dated Mar. 24, 2011, 26 pgs.
Non-Final Office Action cited in U.S. Appl. No. 12/057,000 dated Jul. 5, 2012, 10 pgs.
Reply to Non-Final Office Action cited in U.S. Appl. No. 12/057,000 dated Nov. 5, 2012, 17 pgs.
Non-Final Office action cited in U.S. Appl. No. 12/057,000 dated Jan. 16, 2013, 13 pgs.
Non-Final Office Action cited in U.S. Appl. No. 12/910,757 dated Dec. 2, 2011, 18 pgs.
Reply to Non-Final Office Action cited in U.S. Appl. No. 12/910,757 dated Feb. 27, 2012, 12 pgs.
Notice of Allowance cited in U.S. Appl. No. 12/910,757 dated Jun. 21, 2012, 30 pgs.
Notice of Allowance cited in U.S. Appl. No. 12/910,757 dated Sep. 26, 2012, 38 pgs.
International Preliminary Report cited in PCT Application No. PCT/US2009/034442 dated Sep. 21, 2010, 4 pg.
First Chinese Office Action cited in Chinese Application No. 200980110676.3 dated Jun. 5, 2012, 7 pgs.
Reply first Chinese Office Action cited in Chinese Application No. 200980110676.3 dated Oct. 23, 2012, 28 pgs.
International Preliminary Report cited in PCT Application No. PCT/US2009/034601 dated Sep. 21, 2010, 5 pgs.
First Chinese Office Action cited in Chinese Application No. 200980110662.1 dated Apr. 6, 2012, 6 pgs.
Reply to first Chinese Office Action cited in Chinese Application No. 200980110662.1 dated Aug. 16, 2012, 6 pgs.
Second Chinese Office Action cited in Chinese Application No. 200980110662.1 dated Dec. 18, 2012, 9 pgs.
EP Search Report cited in EP Application No. 09723161.7 dated Oct. 4, 2011, 8 pgs.
EP Communication cited in EP Application No. 09723161.7 dated Oct. 21, 2011, 1 pg.
Reply to EP Communication cited in EP Application No. 09723161.7 dated Dec. 23, 2011, 15 pgs.

(56) References Cited

OTHER PUBLICATIONS

EP Communication cited in EP Application No. 09723161.7 dated Mar. 8, 2012, 5 pgs.
Reply to EP Communication cited in EP Application No. 09723161.7 dated Jul. 6, 2012, 13 pgs.
International Preliminary Report cited in PCT Application No. PCT/US2009/035602 dated Sep. 28, 2010, 6 pgs.
First Chinese Office Action cited in Chinese Application No. 200980112183.3 dated Apr. 12, 2012, 6 pgs.
Reply to First Chinese Office Action cited in Chinese Application No. 200980112183.3 dated Aug. 17, 2012, 40 pgs.
Second Chinese Office Action cited in Chinese Application No. 200980112183.3 dated Dec. 18, 2012, 6 pgs.
International Preliminary Report cited in PCT Application No. PCT/US2008/062191 dated Nov. 10, 2009, 8 pgs.
First Chinese Office Action cited in Chinese Application No. 20080014431.6 dated Mar. 22, 2011, 10 pgs.
Reply to first Chinese Office Action cited in Chinese Application No. 20080014431.6 dated Jun. 29, 2011, 15 pgs.
Third Chinese Office Action cited in Chinese Application No. 20080014431.6 dated Jul. 6, 2012, 9 pgs.
Reply to third Chinese Office Action cited in Chinese Application No. 20080014431.6 dated Jul. 24, 2012, 13 pgs.
Fourth Chinese Office Action cited in Chinese Application No. 20080014431.6 dated Oct. 29, 2012, 9 pgs.
Reply to fourth Chinese Office Action cited in Chinese Application No. 20080014431.6 dated Nov. 20, 2012, 13 pgs.
Reply EP Communication cited in EP Application No. 08747323.7 dated Jan. 22, 2010, 8 pgs.
Australian Office Action cited in Australian Application No. 2008247683 dated Mar. 12, 2012, 3 pgs.
Reply to the Australian Office Action cited in Australian Application No. 2008247683 dated Apr. 12, 2012, 18 pgs.
Australian Notice of Allowance cited in Australian Application No. 2008247683 dated Apr. 18, 2012, 3 pgs.
Russian Office Action and Reply cited in Russian Application No. 2009140733 dated May 5, 2012, 1 pg.
Russian Office Action and Reply cited in Russian Application No. 2009140733 dated Aug. 29, 2012, 3 pg.
Russian Notice of Allowance cited in Russian Application No. 2009140733 dated Dec. 20, 2012, 6 pg.
Notice of Allowance cited in U.S. Appl. No. 12/052,534 dated Jun. 25, 2013, 15 pgs.
Reply Non-Final Office Action cited in U.S. Appl. No. 12/052,550 dated Mar. 21, 2013, 18 pgs.
Final Office Action cited in U.S. Appl. No. 12/052,550 dated Jul. 19, 2013, 85 pgs.
Reply Final Office Action cited in U.S. Appl. No. 12/052,550 dated Dec. 19, 2013, 11 pgs.
Reply Non-Final Office Action cited in U.S. Appl. No. 12/057,000 dated Apr. 16, 2013, 16 pgs.
Final Office Action cited in U.S. Appl. No. 12/057,000 dated Jul. 18, 2013, 16 pgs.
Reply Final Office Action cited in U.S. Appl. No. 12/057,000 dated Oct. 18, 2013, 16 pgs.
Non-Final Office Action cited in U.S. Appl. No. 12/057,000 dated Jan. 30, 2015, 11 pgs.
Reply Non-Final Office Action cited in U.S. Appl. No. 12/057,000 dated Apr. 30, 2015, 17 pgs.
Final Office Action cited in U.S. Appl. No. 12/057,000 dated Jun. 3, 2015, 22 pgs.
Non-Final Office Action cited in U.S. Appl. No. 14/064,672 dated Jan. 21, 2015, 7 pgs.
Reply Non-Final Office Action cited in U.S. Appl. No. 14/064,672 dated Mar. 23, 2015, 17 pgs.
Final Office Action cited in U.S. Appl. No. 14/064,672 dated May 1, 2015, 21 pgs.
Second Chinese Office Action cited in Chinese Application No. 200980110676.3 dated Mar. 4, 2013. 9 pgs.
Reply Second Chinese Office Action cited in Chinese Application No. 200980110676.3 dated May 15, 2013, 12 pgs.
Third Chinese Office Action cited in Chinese Application No. 200980110676.3 dated Aug. 30, 2013, 7 pgs.
Reply Third Chinese Office Action cited in Chinese Application No. 200980110676.3 dated Oct. 18, 2013, 12 pgs.
Japanese Office Action cited in Japanese Application No. 2011-500832 dated Jul. 18, 2013, 2 pgs.
Reply Japanese Office Action cited in Japanese Application No. 2011-500832 dated Oct. 18, 2013, 10 pgs.
Reply Second Chinese Office Action cited in Chinese Application No. 200980116621 dated Feb. 28, 2013, 13 pgs.
Chinese Notice of Allowance cited in Chinese Application No. 2009801106621 dated Jul. 5, 2013, 4 pgs.
Reply Second Chinese Office Action cited in Chinese Application No. 2009801121833 dated Feb. 18, 2013, 15 pgs.
Chinese Notice of Allowance cited in Chinese Application No. 2009801321833 dated Jun. 24, 2013, 4 pgs.
Taiwan Search Report cited in Taiwan Application No. 098105019 dated Jul. 17, 2014, 1 pg.
Reply claims Taiwan Office Action cited in Taiwan Application No. 098105019 dated Oct. 14, 2014, 8 pgs.
Taiwan Notice of Allowance cited in Taiwan Application No. 098105019 dated Dec. 18, 2014, 4 pgs.
"Amazon Simple Storage Service (Amazon S3)", Mar. 23, 2013, http://www.amazon.com/gp/browse.html., 5 pgs.
"Google Data APIs (Beta) Developer's Guide-Google Dta APIs Overview", Apr. 21, 2006, http://code.google.com/apis/gdata/overview.html., 2 pgs.
"Linking in a Global Information Architecture", Karen R. Sollins and Jeffrey R. Van Dyke, Jul. 21, 1999, http://www.apaics.miteduipeople/sollins/links, html., pp. 1-18.
"What's in store-Synchronizing Data between WinFS Stores", Jan. 25, 2006, http://blogs.msdn.com/winfs/archive/2006101/251517974.aspx, 4pgs.
VeriSign Data Sheet "VeriSign Unified Authentication Service", Retrieved from the Internet at: www.verisign.com/in/static1037233.pdf, 3 pgs., published in 2005.
"Mapping Between JSON and XML", reprinted from the Internet at: http://msdn2.microsoft.com/en-us/library/bb924435.aspx, 1 pg., Sep. 11, 2008.

\* cited by examiner

DEPLOYABLE, CONSISTENT, AND EXTENSIBLE COMPUTING ENVIRONMENT PLATFORM

BACKGROUND

Many computing environments comprise a large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The organization of objects within a computing system as a disjointed, loosely aggregated set of object systems may create several problems. For example, it may be difficult to present a consistent computing environment to the user through various devices, especially if the devices vary in capabilities (e.g., a high-performance personal workstation, a browser-based public terminal, and a low-performance cellphone device.) As another example, applying services to the objects, such as synchronization and backup, may involve interfacing with each object system to affect the objects managed thereby, and such interfacing may vary among object systems. As a third example, relating a diverse set of objects (such as all of the objects comprising an application) may be difficult due to the incomplete cooperation of the managing object systems.

An alternative technique for representing the objects comprising the computing environment involves organizing the objects in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) The object hierarchy may therefore be deployed to a device, such as a computer or cellphone, to render the computing environment. Alternatively, a server may deliver to a device a representation of the computing environment, e.g., by presenting at least some aspects of the computing environment to the device and accepting input from the device as a user interaction with the computing environment.

Within the computing environment, processes may be executed, such as application processes, user interfaces, and services and maintenance tasks of the operating system encompassing the computing environment. These processes perform a variety of operations on the objects of the object hierarchy, including basic object-generic operations (e.g., creating, reading, modifying, and deleting), more sophisticated object-generic operations (e.g., querying for objects with specific properties, locating a particular object among the distributed object hierarchy, synchronizing two representations of an object, and representing an object according to a data interchange format), and object-specific operations (e.g., operations pertaining to a particular type of object, such as a "login" process applied to an object representing a user profile in order to process a login request.) These processes may also perform a variety of operations applicable to the computing environment (e.g., logging events arising within the computing environment and scheduling processes to be executed within the computing environment.)

In furtherance of the operations of the computing environment processes, a platform may be devised for managing interactions of at least one process with a computing environment hosting the process, comprising various services designed to perform the many types of tasks on behalf of the processes. The platform may be devised, e.g., as a redeployable application runtime, which may reside on a device and mediate interactions between the processes of the rendered computing environment and the object hierarchy representing the computing environment. This runtime may then be deployed in various contexts, e.g., on a computer system for natively executing applications or within another platform, such as a web browser; on a mobile device; and on a remote server that may deliver a representation of the computing environment to another device (e.g., to a web browser on a device.) The platform may also be devised to interact with the object hierarchy and the computing environment host according to a representation state transfer interface, such that the interaction of the platform and the object hierarchy may occur over a standard, stateless connection in a content-independent manner, such as an HTTP connection utilizing standard HTTP verbs (e.g., PUT, GET, POST, and DELETE corresponding respectively to object creating, reading, updating, and removing.) The platform may also include an extensible aspect to permit developers to provide new techniques for accessing certain types of objects, such as by accepting custom services and exposing the custom services to the processes of the computing environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
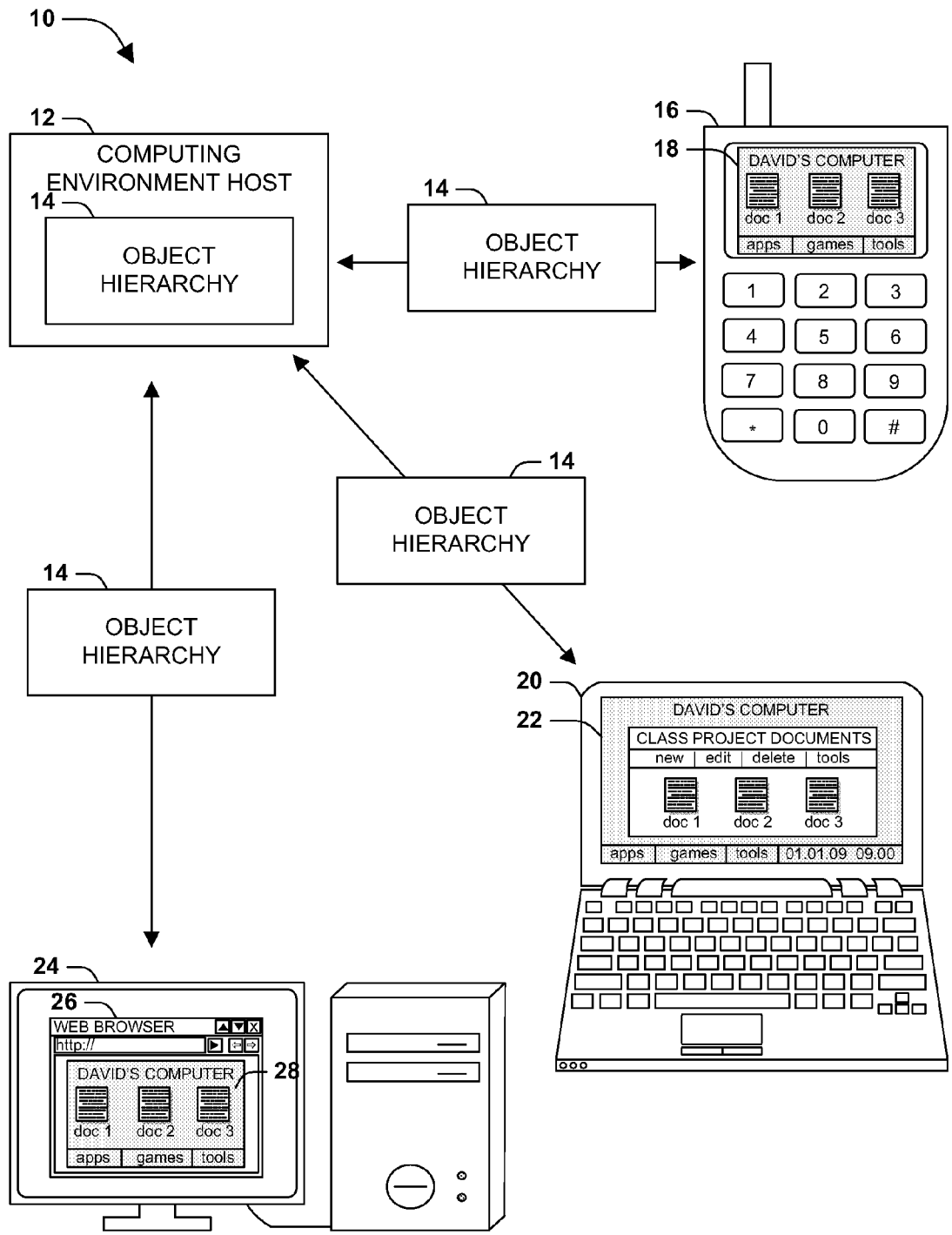
FIG. 1 is an illustration of an exemplary interaction of a computing environment host with various computing environment rendering devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Modern computer systems comprise a large number and variety of objects. Many computer systems feature a file store containing both the files for configuring the computer system (including executables, class libraries, configuration information sets, and resources) and user files generated or received by one or more users. Many computer systems also comprise a wide range of configuration information comprising the computer system hardware and software, including the hardware and devices of the computer system, the operating system, the shell user interface, and the configuration of the applications available within the shell user interface. Various user profiles and accounts may also exist, the former comprising information describing a particular user or user class (name, shell user interface preferences, home directory, etc.), and the latter comprising information describing the privileges of the user or class (file ownership, read/write privileges, access to various devices, etc.) Protected security information, such as passwords, certificates, public/private key pairs, and access control lists, may be stored in a security object, over which the operating system may exert regulated access. One or more data caches may exist, such as browser caches and histories, recent entries in application or browser textboxes, and recently used file and object lists. Various applications may create application- or task-specific archives, such as an email archive containing various folders and messages and a shared address book containing contact information received from various sources by various system users and organized in user-defined groups. Finally, the computer system may be configured to exchange particular sets of information with other computers, users, and devices, such as objects to be synchronized and object sets to which access may be granted with various conditions (read/write privileges, ownership, quotas, etc.) Such object types are typically managed by various management systems (e.g., a file system, a system registry store, a user account management system, and an email system) within the computer system in an ad hoc manner, with little consistency or standardization of access methods or object organization.

The organization of objects within a computing system as a disjointed, loosely aggregated set of object systems may create several problems. As a first example, rendering and maintaining a consistent computing environment comprising a consistent set of objects (such as files, applications, user profiles, application configuration, data caches, etc.) may be very difficult, especially among devices of varying capabilities, such as a personal workstation, a public terminal, and a cellphone device. As a second example, applying services to the objects may be complicated by the storage of diverse objects in multiple object systems. For instance, locating objects matching a particular description (such as objects last modified within a particular time span) may involve querying for matching files through one or more file systems, matching database records through a database system, matching registry keys through a system registry, matching applications through an assembly cache, matching data cache items through various data caches, etc. Because such object systems often store the associated objects in non-standard ways, such as with parameters specific to the nature of the objects (e.g., examining file records through a file system journal, and examining database records through a data-specific timestamp), applying an operation to each the various object systems may be difficult. As a third example, because each object system is configured to manage a particular kind of object, relating and mixing the types of objects may be difficult. For instance, an application may comprise an executable binary stored in an assembly cache, some configuration information stored in a system registry, supplemental files (such as dictionaries for various languages) stored in a file system, and events (such as recently edited documents) stored in data caches. It may be difficult to represent an association of these object types in various systems, and to manipulate all such objects together (e.g., deleting all such objects in order to uninstall the application.) As a fourth example, the object set of the computer system may be distributed across several devices, and providing consistent access to the object sets may be complicated by the various configurations of the devices, the network capabilities of each device, and incompatibilities in the wire formats used by each device for exchanging data (e.g., a first device may be configured to exchange data according to an XML schema, and a second device may be configured to exchange data according to JSON.)

An alternative approach may be devised, wherein the computing environment is represented in a manner that may be delivered to devices for rendering according to the capabilities of the device. The representation comprises a set of objects organized according to an object hierarchy and represented according to a common grammar. The objects include the data objects of the computer system, such as the user files and data created by the user. The objects also include the executable binaries and class libraries comprising the operating system components, such as the shell, and the applications offered therein. The object also include the information specifying the user interface of a computing environment, including shell preferences (e.g., visual themes, application launch menu, and double-click threshold), user accounts and privileges, security information (e.g., passwords, security tokens, and certificates), application binaries and configuration information, user data and metadata (e.g., file sharing information), and data caches (e.g., most-recently-used file lists and browser history.) Despite the various nature and uses of these objects, the objects are represented in a common manner in the object hierarchy, and may be arbitrarily organized in the hierarchy. Thus, in contrast with former systems comprising a set of isolated data stores, each containing one type of object (e.g., a file system containing files, a registry containing configuration information, and a data cache containing the browser history), the object hierarchy in this approach organizes all such objects in a common manner in the object hierarchy.

A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered. Also, the devices sharing the computing environment may be integrated through the shared information set, such that one device may interact with others that are identified in the information set; e.g., data stored on a first device may be accessed by a second device, and a first device may be controlled by a second device through a communications conduit. The information set may therefore identify the collection of devices that share the computing environment, along with the roles, capabilities, and resources of each device, to provide an integrated computing experience across a potentially large number and variety of devices.

FIG. 1 illustrates one such scenario 10, wherein the computing environment may be hosted by a computing environment host 12, which may store and manage an object hierarchy 14. The computing environment host 12 may also render the object hierarchy 14 in different ways on behalf of various devices, such as a cellphone device 16, a personal notebook computer 20, and a public workstation 24, and also on behalf of different types of users having different access privileges. The rendering of the computing environment therefore reflects a consistent computing environment across all devices that expose the same applications, user profiles, shell configuration, user data objects, etc. Thus, a user may access a full-featured version 22 of the computing environment through a high-performance notebook computer, a stripped-down version 18 of the computing environment on a low-power cellphone device 16, and a browser-compatible and privacy-oriented version 28 of the computing environment through a web browser 146 of a public terminal 24. To the extent that the capabilities of each such device support the rendering of the computing environment, a consistent user interface and data set may be presented due to the rendering of the object hierarchy 14 adjusted to the capabilities of each device. Updates to the computing environment may be propagated back to the computing environment host 12, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Moreover, the computing environment host 12 may apply services to the various objects comprising the object hierarchy 14, and the common format in which the objects are stored in the object hierarchy may facilitate consistent availability and application of the services regardless of the nature of the objects applied thereto.

The computing environment rendered on such devices typically comprises one or more processes representing discrete tasks within the computing environment. As one example, an operating system may be rendered as an encompassing framework for the computing environment, and the operating system may utilize a variety of processes for achieving various computing environment tasks, such as managing memory and data items, communicating with devices such as printers and optical discs, and presenting a computing environment user interface to a user. The operating system may also host a variety of applications, such as a word processor application and a web browser, and each application may comprise one or more processes relating to the performance of the application. Each process typically comprises one or more threads of execution applied respectively to sets of instructions, and a set of resources, such as segments of memory and reservations for access to devices such as a display adapter.

If the computing environment is represented as a diverse set of objects, the processes often interact with the objects in furtherance of the tasks of the processes. For instance, an operating system process involving memory management may generate, relocate, compress, and remove objects in the object hierarchy in order to organize the memory block containing the objects, and a web browser application may interact with objects representing website bookmarks, cookies, and entries in a history cache during a typical web browsing session. The interactions may be comparatively simple, such as requesting the object hierarchy to store a new object, read an object for a process, and modify or remove the object; or may be comparatively sophisticated, such as synchronizing the data contents of two objects or identifying the location of an object among the set of data stores comprising the object hierarchy; or may be object-specific, e.g., attempting to process a "login" function on a "user profile" object type when a user initiates an attempt to login to the computing environment through the user profile. The processes may also interact more generally with the computing environment, such as by accessing an event log containing a record of various events arising in the computing environment, or by scheduling another process to be executed if a particular set of conditions are satisfied (e.g., "if the time is midnight and no users are logged into the computing environment, run an archival backup process.")

Thus, the processes of the computing environment may request various types of access to the objects of the object hierarchy, in a variety of locations, and often in concurrence or conflict with access requests by other objects (e.g., a first process may request to read an object while a second process requests to delete the object.) Moreover, the performance of these processes may be device- and context-specific. For example, a request to play a movie object may be differently handled if performed on a native application on a computer system, which may play the movie unfettered; on a mobile device, such as a cellphone, which may prefer to have the movie downsampled for display on a small screen; within a web browser, which may display the video as part of a web page; and on a computing environment host or remote server, which may not directly play the movie on a local display, but may deliver a version of the device for rendering.

In order to facilitate the many types of access requested by processes to the objects of an object hierarchy, along with the multiple contexts within which such request may arise, a platform may be devised for managing interactions of at least one process with a computing environment hosting the process, comprising various services designed to perform the many types of tasks on behalf of the processes. For example, the platform may expose to the processes of the computing environment an object synchronizing service, which processes may utilize to unify the contents of various objects, and an object querying service, which processes may utilize to identify objects matching certain criteria (e.g., objects comprising entries in a web browser history cache that are no more than one week old, thereby generating a set of recently visited websites.) Such services may be basic and type-generic, e.g., object creating, reading, modifying, and deleting services; may be more sophisticated but still type-generic (e.g., an object synchronizing service that queries for objects with specific properties, and an object locating service that locates a particular object among the distributed object hierarchy); and may be type-specific (e.g., a "login" service applied to a "user profile" object type in order to process a request by the represented user to login to the computing environment.) These services may also apply to various aspects of the computing environment, e.g., an event logging service that records and describes significant events arising under various conditions within the operating system.

A platform of this nature may be included within various aspects of the computing environment. For instance, the platform may be devised as a redeployable application runtime, which may reside on a device and mediate interactions between the processes of the rendered computing environment and the object hierarchy representing the computing environment. The application runtime may also be deployed in various contexts, e.g., on a computer system for natively executing applications or within another platform, such as a web browser; on a mobile device; and on a remote server that may deliver a representation of the computing environment to another device (e.g., to a web browser on a device.) The deployment of the application runtime to a compatible device may therefore permit applications of the computing environment to interact with the object hierarchy in a content-independent manner. Additional features may be provided to exhibit additional properties of the computing environment that may be advantageously utilized by some processes.

Figure 2:
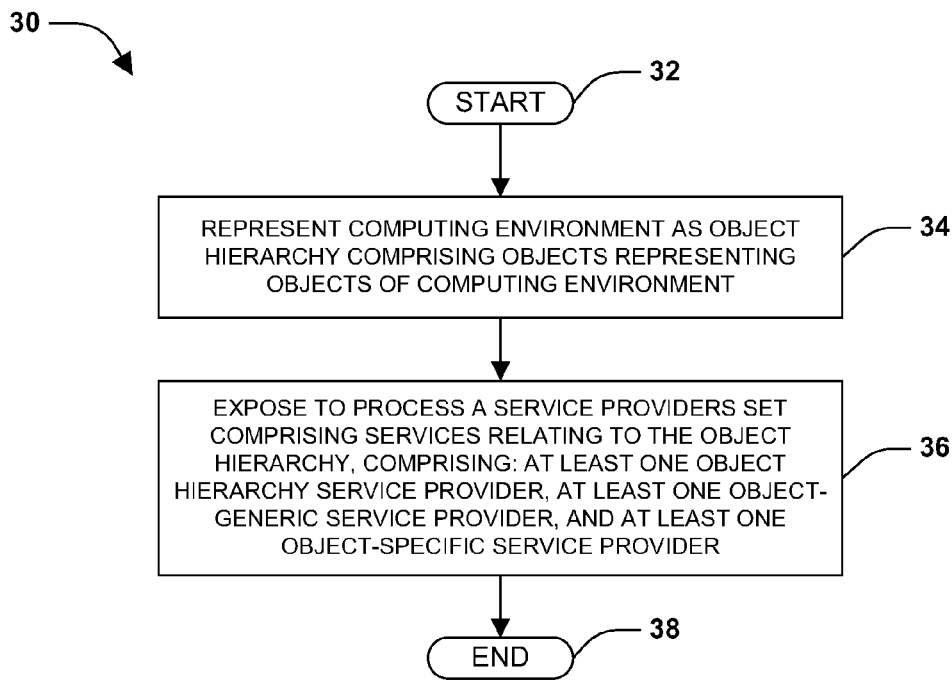
FIG. 2 is a flow diagram illustrating an exemplary method of managing interactions of processes with a computing environment hosting the processes.

FIG. 2 presents one embodiment of these techniques, illustrated as an exemplary method 30 of managing interactions of at least one process with a computing environment hosting the process. The exemplary method 30 begins at 32 and involves representing 34 the computing environment as an object hierarchy comprising objects representing the objects of the computing environment. The exemplary method 30 also involves exposing 36 to the process a service providers set comprising services relating to the object hierarchy. The service providers exposed to the process are generally of three types: object hierarchy service providers, which are configured to provide an object hierarchy service to the object hierarchy (e.g., an event logging service); object-generic service providers, which are configured to provide a type-independent object service to the objects of the object hierarchy (e.g., an object synchronization service); and object-specific service providers, which are configured to provide a type-specific object service to the objects of the object hierarchy of a specified object type (e.g., a "login" service for processing a login request on a "user profile" type of object.) Having represented the computing environment as an object hierarchy and having exposed the object hierarchy to the processes of the computing environment through various service providers, the exemplary method 30 thereby promotes the interaction of the computing environment processes with the object hierarchy, and so ends at 38.

Figure 3:
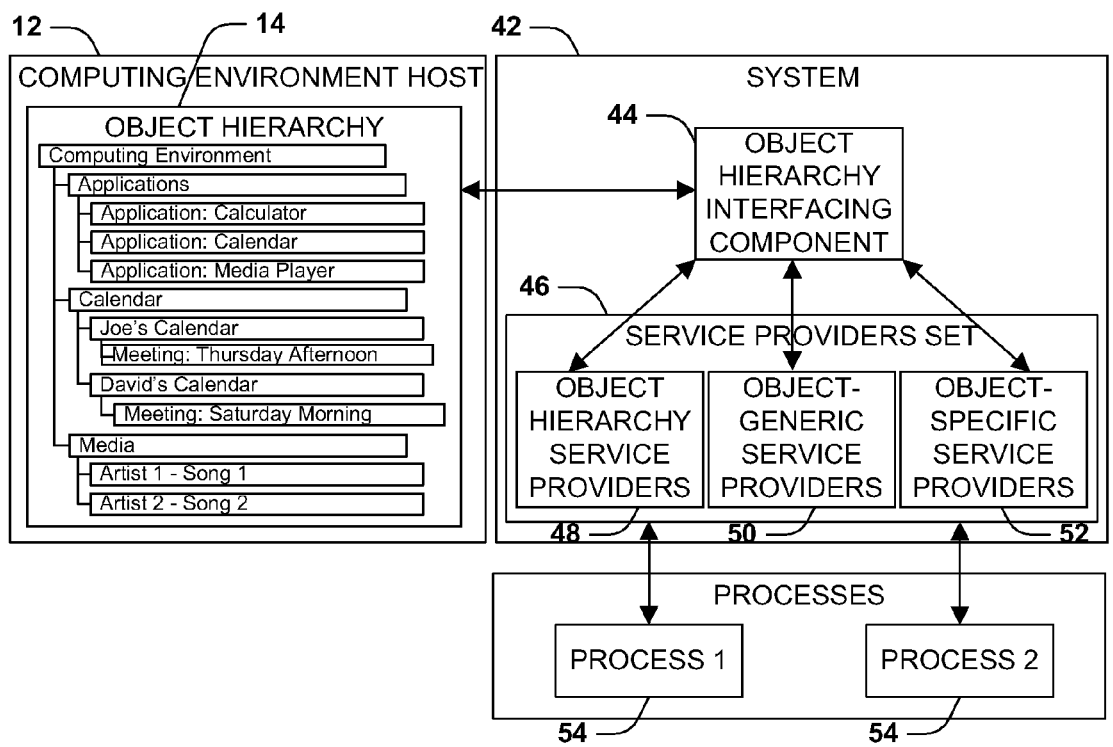
FIG. 3 is a component block diagram illustrating an exemplary system for managing interactions of processes with a computing environment hosting the processes.

FIG. 3 presents another embodiment of these techniques, illustrated as an exemplary system 42 configured to manage interactions of at least one process 54 with a computing environment hosting the process 54. The exemplary system 42 might comprise, e.g., an application runtime residing on a computer system or device, or within a platform thereof (e.g., within a webserver or web browser), and adapted to mediate the interaction of the processes 54 of the computing environment with the object hierarchy 14 stored on the computing environment host 12. The exemplary system 42 comprises an object hierarchy interfacing component 44 configured to access objects of the object hierarchy 14 representing the objects of the computing environment, which may be stored by the computing environment host 12. The exemplary system 42 also includes a service providers set 46, which comprises services relating to the object hierarchy 14. The service providers set 46 generally includes three types of services: at least services: object hierarchy service providers 48, which are configured to provide an object hierarchy service to the object hierarchy 14; object-generic service providers 50, which are configured to provide a type-independent object service to the objects of the object hierarchy 14; and object-specific service providers 52, which are configured to provide a type-specific object service to the objects of the object hierarchy 14 of a specified object type. The exemplary system 42 therefore presents a set of services to the processes 54 that facilitate the operations of the processes 54 on the object hierarchy 14 and the objects contained therein.

The techniques described herein may be implemented with variations in many aspects, and some variations may present additional advantages and/or reduce disadvantages with respect to other variations of these and other techniques. These variations may be included in various embodiments, such as the exemplary method 30 of FIG. 2 and the exemplary system 42 of FIG. 3, and may be compatible with other such variations to present several such additional advantages and/or reduced disadvantages. Those of ordinary skill in the art may therefore devise many such embodiments in accordance with the techniques discussed herein.

A first aspect that may vary among implementations of these techniques relates to the organization of the platform through which the service providers are organized, which may be modeled according to various architectures and embedded in various components of a computer system or device. As one example, the platform may be formulated as an application runtime, which may be deployed to a computer system or device that is capable of rendering the computing environment and executing the processes thereof. Alternatively, the platform may be embedded in another application, such as a web browser that is configured to host a representation of the computing environment. For instance, the platform may be configured to provide the services of the service providers set to at least one of a computer system, a mobile device, and a web browser rendered on a device. Those of ordinary skill in the art may devise many locations in a computer system or device where the platform may be formulated to facilitate the computing environment processes while implementing the techniques discussed herein.

Figure 4:
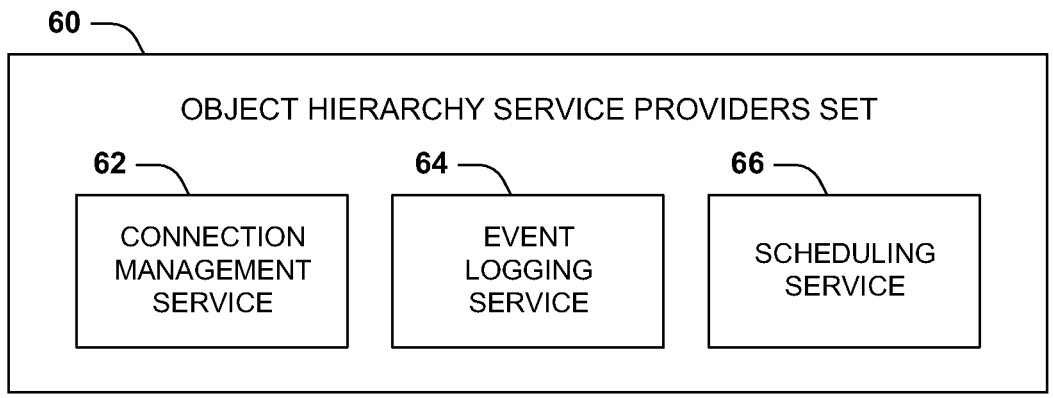
FIG. 4 is a component block diagram illustrating an object hierarchy service providers set that may be included in an exemplary system for managing interactions of processes with a computing environment hosting the processes.

A second aspect that may vary among implementations of these techniques relates to the object hierarchy service providers included in the platform, which may offer many types of services with respect to the object hierarchy as a whole or a portion thereof. FIG. 4 illustrates an exemplary object hierarchy service providers set 60 comprising three such object hierarchy service providers. It may be appreciated that these object hierarchy service providers may be differently factored, omitted, superseded, and/or supplemented with additional object hierarchy service providers, and that the exemplary object hierarchy service providers set 60 is presented only as one suitable set of services that may be exposed to processes of the computing environment with respect to operations on the object hierarchy as a whole.

The exemplary object hierarchy service provider set 60 includes a connection management service 62, which may be configured to secure and manage a communications channel between the processes and the computing environment host storing the object hierarchy. The connection may be achieved through many physical communications channels, such as an Ethernet physical connection, a coaxial connection, an optical fiber connection, etc., and/or using many forms of data link layers, such as Ethernet, various forms of 802.11 wireless data links, EVDO, etc. The connection may also be made over various transport protocols, such as TCP and UDP, and using various network protocols, such as IPv4, IPv6, and IPX. The communications channel may be connection-oriented, such as in TCP, or connectionless, such as in UDP. Also, the communications channel may involve various application layer protocols, such as HTTP, FTP, and SOAP. The connection management host may also pool a series of connections and/or protocols to provide a more robust, higher bandwidth, lower latency, or higher security connection. In addition to establishing and maintaining a network connection with the computing environment host, the connection management service may also perform more sophisticated services related thereto, such as encryption via SSL, user and/or device authentication via Kerberos, and bandwidth prioritization and throttling.

One aspect of the connection management service 62 that may be particularly advantageous relates to the nature of the interaction between the connection management service 62 and a computing environment host. In one such embodiment, the connection may be devised as a stateless interaction that reduces the communications burden on the computing environment host. Alternatively or additionally, the connection may be established over a conventional communications channel, such as HTTP, rather than a specialized or proprietary communications channel, which may be less well-understood, broadly supported in hardware and software, and compatible with security functions, such as firewalls that may block less familiar types of network traffic. Alternatively or additionally, the connection management service 62 may be configured communicate with the computing environment host through a constrained set of operators, such as (e.g.) the standard set of HTTP (PUT, GET, POST, and DELETE, which may correlate with the common operations of creating, reading, updating, and deleting objects, respectively.) Alternatively or additionally, the connection management service 62 may identify objects of the object hierarchy according to a standardized addressing model, such as the Uniform Resource Identification (URI) addressing model, which may be more broadly compatible with various software and hardware components. A particularly advantageous embodiment may implement all of these techniques to form a representation state transfer ("RESTful") interface, wherein the objects of the object hierarchy are addressed according to URIs and accessed over a stateless HTTP connection using the common set of HTTP verbs. This embodiment may present many advantages, such as a cacheable communication between the platform and the computing environment host, an efficiently conservative allocation of resources used to maintain the connection, and broad compatibility with networking software and hardware components. However, those of ordinary skill in the art may be able to devise many communications techniques between a connection management service 62 and a computing environment host while implementing the techniques discussed herein.

The exemplary object hierarchy service provider set 60 also includes an event logging service 64, which may be configured to log events arising within the computing environment represented by the object hierarchy. The events may be recorded to document the interaction of various processes within the computing environment, and the consequences of such processing of various significance. As one example, the computing environment may include a set of logged news items, which represent more significant events in the computing environment, e.g., an insertion of a set of objects, an addition of a device that is newly available in the computing environment, and the creation of a new user account. As another example, the computing environment may include a set of logged activities, which represent events in the computing environment of less or more ephemeral significance, e.g., a visitation of a website in a browser, a copying of data to a copy buffer, and a transmission of an object across a communications channel. A process in the computing environment may interact with the event logging service 64 in order to record events generated by the process. A process may also interact with the event logging service 64 in order to review historic events of a certain type, such as occurring during a certain set of dates, or to subscribe to events of a particular type, which the event logging service 64 may fulfill by arranging to have the process notified when such events arise in the future.

The exemplary object hierarchy service provider set 60 also includes a scheduling service 66, which may be configured to schedule conditional actions within the computing environment represented by the object hierarchy. A process may request the computing environment to monitor certain set of conditions, and to take a particular action when the conditions are fulfilled. As a first example, a process may implement a memory compaction action that is activated whenever the memory of the computing environment runs low. The memory compaction action may examine the objects comprising the memory of the computing environment to identify resources that may be released, such as objects that are no longer referenced. As a second example, a process may request the scheduling service 66 to arrange for a periodic retrieval of email from an email server, which may be invoked every ten minutes to pull new email messages into the computing environment. These and other object-hierarchy-level services may be included in the object hierarchy service providers set, and may be implemented by those of ordinary skill in the art while devising a platform for managing interactions of processes in a computing environment with the objects of an object hierarchy as discussed herein.

Figure 5:
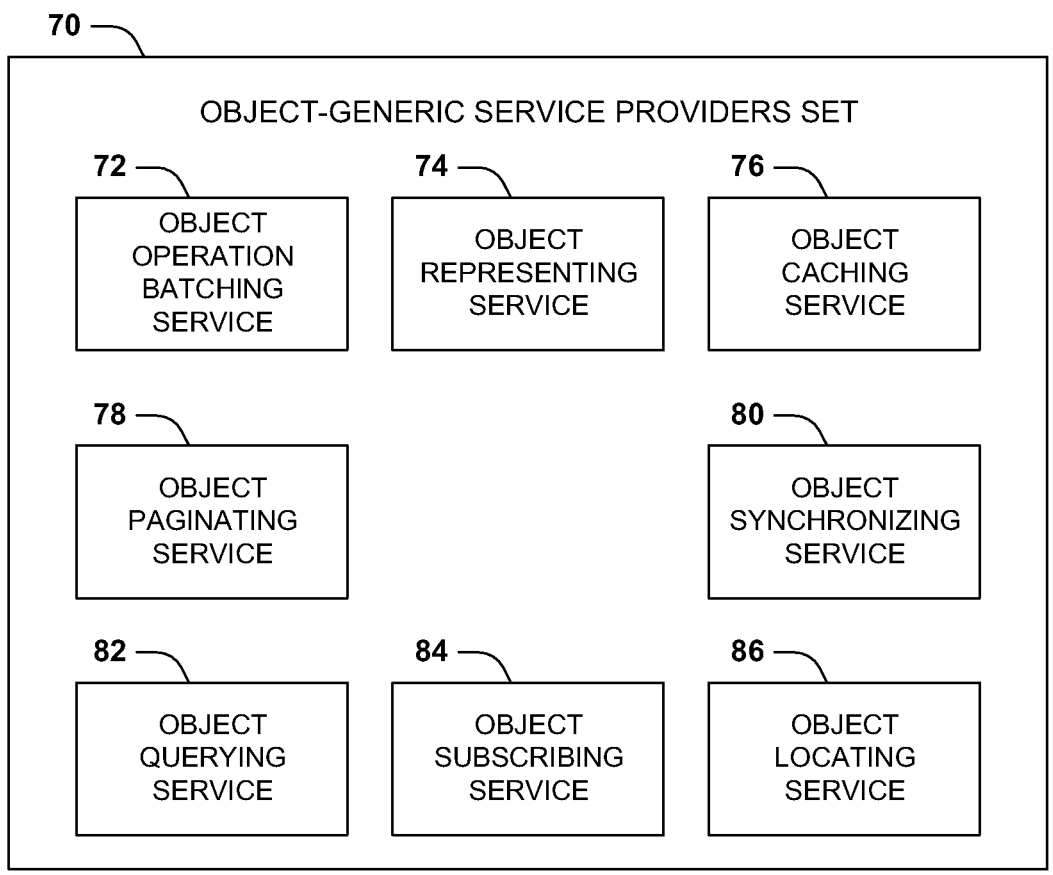
FIG. 5 is a component block diagram illustrating an object-generic service providers set that may be included in an exemplary system for managing interactions of processes with a computing environment hosting the processes.

A third aspect that may vary among implementations of these techniques relates to the object-generic service providers included in the platform, which may offer many types of services with respect to one or more objects stored in the object hierarchy. FIG. 5 illustrates an exemplary object-generic service providers set 70 comprising eight such object-generic service providers. It may be appreciated that these object-generic service providers may be differently factored, omitted, superseded, and/or supplemented with additional object-generic service providers, and that the exemplary object hierarchy service providers set 70 is presented only as one suitable set of services that may be exposed to processes of the computing environment with respect to various objects of the object hierarchy.

The exemplary object-generic service provider set 70 includes an object operation batching service 72, which may be configured to receive an object operations set comprising operations to be applied to objects of the object hierarchy and to apply the object operations to objects of the object hierarchy. It may be appreciated that a process is executing on a device may be able to communicate with the computing environment host over a network having a certain amount of latency, i.e., with a certain delay between a request to perform an operation on an object of the object hierarchy and a response indicating the result of the operation. This delay may be inconvenient for some types of communication, such as a large set of operations to be performed in series. Instead of sending each operation to the computing environment host and awaiting a response before sending the next operation request, the object operation batching service 72 may send many such operations as a batch. The object operation batching service 72 may accept a set of such operations, send them as a batch to the computing environment host, and route the results of the invocations upon receiving an aggregated response from the computing environment host. Alternatively or additionally, the object operation batching service 72 may accept an object operation logic, which may include (e.g.) Boolean logic and variable manipulation (e.g., "try to create objects of random names in a particular folder, and keep trying until one hundred such objects are created.") The logic may be sent to the computing environment host as a batch, e.g. as a mobile agent, and the object operation batching service 72 may receive the result upon completion and may deliver the result(s) to the initiating process. The resulting application of operations to the objects of the object hierarchy may appear to be "chunky" rather than "chatty," and may result in a performance improvement due to a reduction in network transport costs.

The exemplary object-generic service provider set 70 includes an object representing service 74, which may be configured to represent objects of the object hierarchy according to a data interchange format. Different types of processes may request to receive objects formatted in a particular manner, such as according to XML, RSS, JSON, or Atom. The object representing service 72 may enable a process to request a particular data interchange format in which a particular object or set of objects is to be represented. In one such embodiment, the object representing service 72 may request and receive from the object hierarchy a basic representation of the objects, and may then reformat the representation of the object according to the specified data interchange format before delivering the result to the requesting process. In another such embodiment, the object representing service 72 may specify to the computing environment host the data interchange format in which the object is preferably specified, and may receive and deliver to the process the preferably formatted representation of the object.

The exemplary object-generic service provider set 70 includes an object caching service 76, which may be configured to manage cache items with respect to objects of the object hierarchy. For example, the object caching service 76 may create a data cache on behalf of a process, such as a browsing history cache for a web browser process or a most-recently-used documents list for an office productivity process. The object caching service 76 may also insert some cache items into the data cache, either automatically (e.g., by monitoring events arising in the system and caching a notification of each such event) or upon request of the process. The object caching service 76 may also fetch items from the cache on behalf of a process, either automatically (e.g., by requesting an object either from the computing environment host if not cached, or from an object cache if the object was recently retrieved) or upon request of the process. The caches created and managed by the object caching service 76 may pertain to a particular user, process, application, object or set of objects, etc., and may have variable volatility, e.g., a temporary data cache for a less significant set of cache items and a stored data cache for a more significant set of cache items.

The exemplary object-generic service provider set 70 includes an object paginating service 78, which may be configured to retrieve a selected portion of an object of the object hierarchy. It may be appreciated that some objects in the object hierarchy may be very large, e.g., a high-definition movie object. Rather than attempting to retrieve the entire object across the network, a process may wish to obtain only a portion of an object, such as while streaming a media object across a network. The object paginating service 78 may therefore accept a request to retrieve only a specified portion of an object, such as the first 100 kilobytes of a data object or the first ten records of a data set. The object paginating service 78 may also comprise a stateful cursor that identifies a location within an object that was last retrieved, and may provide a next segment of the object upon request by a process.

The exemplary object-generic service provider set 70 includes an object synchronizing service 80, which may be configured to synchronize a first version of an object in an object hierarchy with a second version of an object in an object hierarchy. When a device is first added to a mesh, the computing environment host may deliver to the device a complete or selected portion of the object hierarchy. The objects of the computing environment may subsequently change on one or both of the computing environment host and the device, and a synchronization technique may be applied to reunify the divergent object hierarchies. The object synchronization service 80 may therefore synchronize respective objects of the object hierarchy stored on the computing environment host and on the device in order to resolve version conflicts. The object synchronization service 80 may utilize may synchronization techniques for detecting changes (e.g., object system journaling and/or object hashcode comparison) and for performing a synchronization between two divergent objects. The object synchronization service 80 may also perform a synchronization of two objects in the same object hierarchy, e.g. in order to de-duplicate portions of the object hierarchy, or upon request of a process.

The exemplary object-generic service provider set 70 includes an object querying service 82, which may be configured to receive a query from a query agent over the objects of the object hierarchy, apply the query to the objects of the object hierarchy to produce a query result, and return the query result to the query agent in response to the query. The query agent may be a user who wishes to identify particular types of objects (e.g., objects having a certain name) or may be a process (e.g., a backup process that queries for objects created or updated since the lat backup.) The object querying service 82 may share part or all of the querying computation with the computing environment host, may respond either with references to identified objects or representations of the identified objects, etc.

The exemplary object-generic service provider set 70 includes an object subscribing service 84, which may be configured to receive a subscription request from a subscription agent with regard to an object and notify the subscription agent of events arising with respect to the object. The subscription agent may be a user who wishes to receive a personal notification when a certain type of event arises, e.g., a request to send an email to the user when objects are added to a particular object collection, like a photo album. The subscription agent may also be a process, e.g., an antivirus package that requests notification of incoming email messages and objects to scan the messages and objects for viruses. The object subscribing service 84 may therefore provide notification either by generating and sending a message, or by activating a specified process.

The exemplary object-generic service provider set 70 includes an object locating service 86, which may be configured to locate an object stored in an object hierarchy distributed across at least two object hierarchy portions. An object hierarchy may be distributed among the computing environment host and one or more devices; e.g., a notebook computer represented in the mesh may store a set of photos, and a cellphone device represented in the mesh may store a set of contacts. When a process requests access to an object, it may be difficult to determine where the object resides and how to access it. The object locating service 86 may therefore identify the device on which the portion of the object hierarchy containing an identified object is stored, and may negotiate a communications connection with the device in order to grant access to the requesting process. These and other generic object-level services may be included in the object-generic service providers set, and may be implemented by those of ordinary skill in the art while devising a platform for managing interactions of processes in a computing environment with the objects of an object hierarchy as discussed herein.

A fourth aspect that may vary among implementations of these techniques relates to the addition of custom object-specific service providers to the object-specific service providers set. A developer may wish to devise a new type of service to be applied to a particular type of object stored in the object hierarchy; e.g., an audio streaming service may be added to generate an audio stream for one or more audio objects stored in an object hierarchy. The developer may therefore develop a custom object-specific service, and may wish to register the object-specific service within the computing environment for use by other processes. Accordingly, the platform may include a type-specific object service registering component that is configured to receive a custom type-specific object service, and to expose the custom type-specific object service to the process in the computing environment. Other processes may then discover and invoke the custom service provider in order to utilize the new service with respect to the specified object types.

Figure 6:
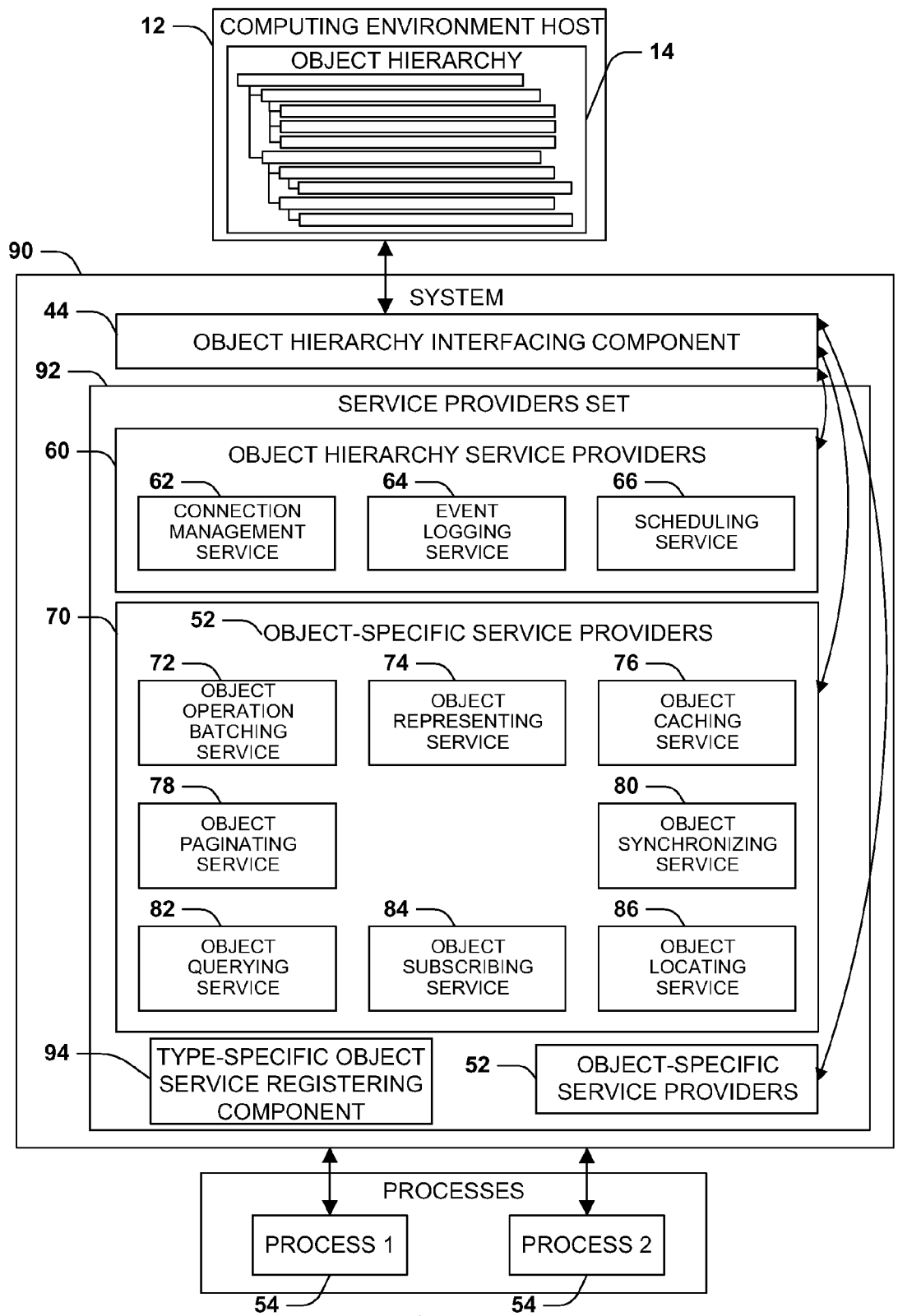
FIG. 6 is a component block diagram illustrating another exemplary system for managing interactions of processes with a computing environment hosting the processes.

The variations of the aspects discussed hereinabove may also be implemented in combination with other variations of these aspects. The resulting embodiment may therefore exhibit several advantages and/or a reduction of several disadvantages as discussed heretofore. One such combination embodiment is illustrated in FIG. 6, illustrating an exemplary system 90 for managing interactions of at least one process 54 with a computing environment hosting the process, which may be represented by an object hierarchy 14 stored by a computing environment host 12. The exemplary system 80 is configured to provide services through service providers that mediate interactions between the object hierarchy 14 and one or more processes 54, as discussed herein. The exemplary system 80 may also be formulated and included in a computer system or device in many forms, e.g., as an application runtime through which the processes of the rendered computing environment interact with the object hierarchy 14. The exemplary system 80 may also provide such services for various devices and contexts, such as a computer system, a mobile device, and a web browser rendered on a device, as illustrated in FIG. 1.

The exemplary system 90 of FIG. 6 includes an object hierarchy interfacing component 44, which is configured to access objects of the object hierarchy 14 representing the objects of the computing environment. Moreover, the object hierarchy interfacing component 44 is configured to communicate with the computing environment host 14 according to a representation state transfer interface, involving a stateless interaction with URI-addressed objects over a conventional communications channel (such as an HTTP connection) and using a constrained set of operators (such as common HTTP operators, including PUT, GET, POST, and DELETE to reflect creating, reading, updating, and deleting such objects, respectively.)

The exemplary system 90 of FIG. 6 also includes a service providers set 92, which comprises services relating to the object hierarchy 14. The service providers set generally comprises three types of service providers: object hierarchy service providers 60, object-generic service providers 70, and object-specific service providers 54. This exemplary system 90 features several object hierarchy service providers 60, including a connection management service 62, which is configured to secure and manage a communications channel between the processes and the computing environment host storing the object hierarchy; an event logging service 64, which is configured to log events arising within the computing environment represented by the object hierarchy; and a scheduling service 66, which is configured to schedule conditional actions within the computing environment represented by the object hierarchy. The exemplary system 90 also features several object-generic service providers 70, including an object operation batching service 72, which is configured to receive an object operations set comprising operations to be applied to objects of the object hierarchy and to apply the object operations to objects of the object hierarchy; an object representing service 74, which is configured to represent objects of the object hierarchy according to a data interchange format; an object caching service 76, which is configured to manage cache items with respect to objects of the object hierarchy; an object paginating service 78, which is configured to retrieve a selected portion of an object of the object hierarchy; an object synchronizing service 80, which is configured to synchronize a first version of an object in an object hierarchy with a second version of an object in an object hierarchy; an object querying service 82, which is configured to receive a query from a query agent over the objects of the object hierarchy, apply the query to the objects of the object hierarchy to produce a query result, and return the query result to the query agent in response to the query; an object subscribing service 84, which is configured to receive a subscription request from a subscription agent with regard to an object and notify the subscription agent of events arising with respect to the object; and an object locating service 86, which is configured to locate an object stored in an object hierarchy distributed across at least two object hierarchy portions.

The exemplary system 90 also comprises a type-specific object service registering component 94, which is configured to receive a custom type-specific object service, and to expose the custom type-specific object service to the process 54 in the computing environment. Finally, the exemplary system 90 also comprises at least one object-specific service provider 52, which is configured to provide a type-specific object service to the objects of the object hierarchy 14 of a specified object type. The exemplary system 90 configured in this manner thereby presents several of the advantages and reduces several of the disadvantages discussed with respect to the particular services and variations of aspects discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
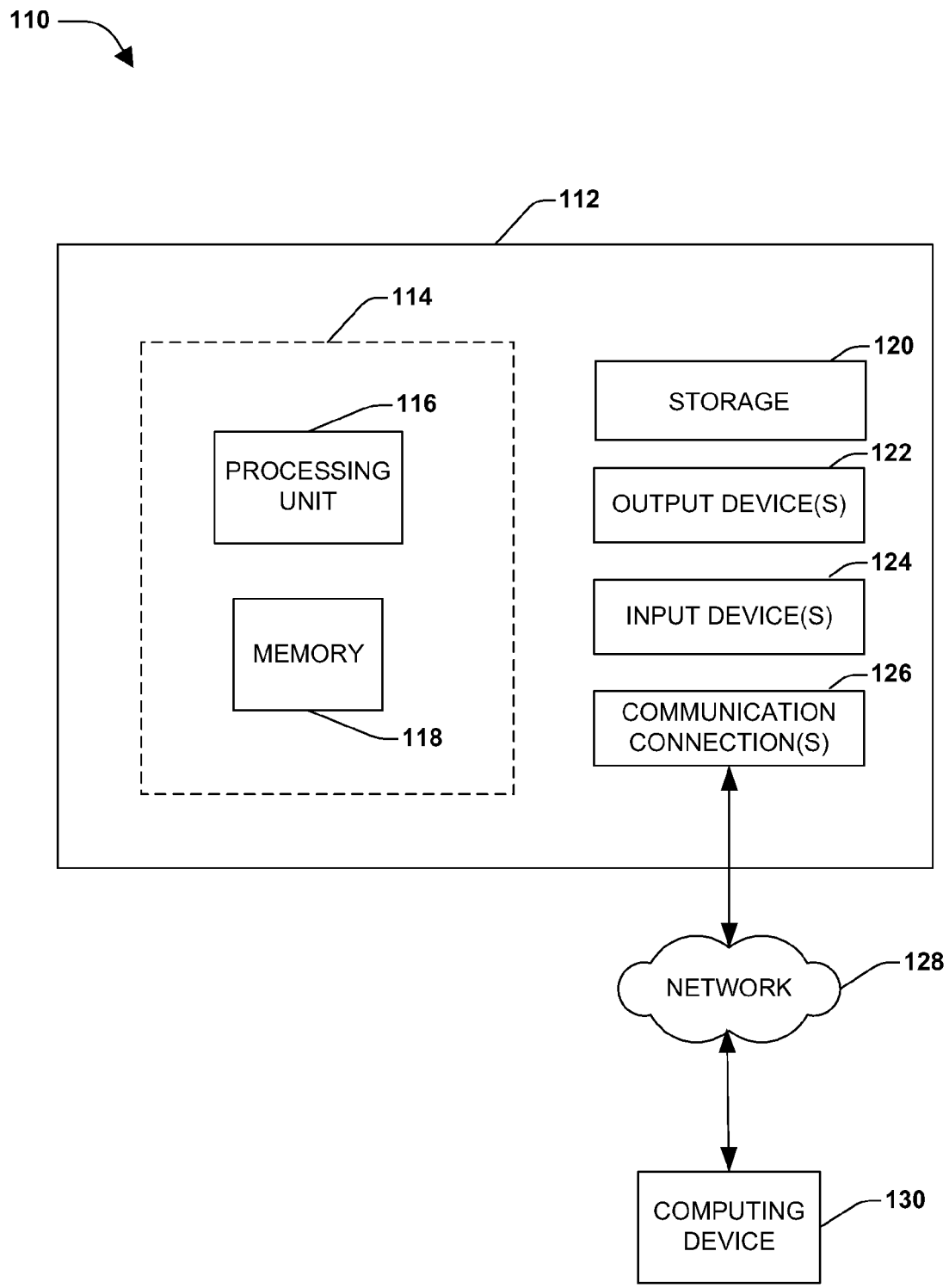
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 7 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 7 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of exposing a computing environment to a process according to an access protocol comprising at least one verb that is applicable to respective objects irrespective of respective object type of the respective objects, wherein the method involves a computer having a processor and an object manager set of object managers that respectively apply actions to objects of an object type, and comprises:
   executing on the processor instructions that cause the computer to:
      present the computing environment to the process as an object hierarchy of the objects respectively having the object type and managed by an object manager, the computing environment respectively managed by the object manager, wherein the object hierarchy comprise:
         a file object representing a file system object of a file manager of the computing environment;
         an application object representing an application executable within the computing environment and managed by an application manager;
         a device object representing a device accessible to the computing environment and accessible through a device manager; and
         a user profile object representing a user profile of a user of the computing environment and accessible through a user profile manager;
      identify the respective objects to the process by a location with the object hierarchy; and
      responsive to receiving a request from the process to invoke a selected verb of the access protocol on a selected object identified by a selected object location:
         identify a selected object type of the object located at the selected object location within the object hierarchy;
         identify, from the object manager set, a selected object manager that manages objects of the selected object type;
         identify, for the selected object manager, a selected action that performs the selected verb of the access protocol to the objects of the selected object type; and
         invoke the selected object manager to perform the selected action corresponding to the selected verb on the selected object.

2. The method of claim 1, wherein:
the respective object managers are associated with an object manager location within the object hierarchy; and
presenting the object manager set to the process comprises:
   presenting the respective object managers through a representational state transfer interface that, upon receiving a request specifying the object manager location of the object manager, perform the selected action on the object of the object hierarchy identified by the location while refraining from retaining a state of the request specifying the object manager location.

3. The method of claim 2, wherein:
the location of the respective objects of the object hierarchy and the object manager location of the respective object managers comprising a uniform resource identifier;
the access protocol comprises hypertext transport protocol; and
the request specifying the object manager location comprising a hypertext transport protocol request specifying the uniform resource identifier of the object manager and the uniform resource identifier of an object associated with the object manager.

4. The method of claim 1, wherein the object manager set includes an object access manager that, upon receiving a request to provide an object of the object hierarchy to the process, provides the object of the object hierarchy identified by the location to the process.

5. The method of claim 4, wherein the providing the object of the object hierarchy further comprises: providing a device-specific version of the object to the device executing the process.

6. The method of claim 5, wherein the providing the device-specific version of the object further comprises:
identifying at least one capability of the device; and
generating the device-specific version of the object that is compatible with the at least one capability of the device.

7. The method of claim 6, wherein:
the device is accessible to the computer over a communication channel; and
the generating the device-specific version of the object further comprises:
formatting the object according to a data interchange format that is compatible with the communication channel.

8. The method of claim 1, wherein the object manager set comprises:
at least one object hierarchy object manager that is applicable to the object hierarchy;
at least one object-generic service applicable to the respective objects of the object hierarchy irrespective of the object type of the object; and
at least one object-specific service applicable to the respective objects of the object hierarchy of the selected object type.

9. The method of claim 1, wherein:
the device is accessible to the computer over a communication channel; and
the object manager set comprises a connection management service provider that manages a connection session between the device and the computer over the communication channel.

10. The method of claim 1, wherein the object manager set comprises a batching service provider that, upon receiving a request from the device to invoke a first object manager of the object manager set with a first object of the object hierarchy and to invoke a second object manager of the object manager set with a second object of the object hierarchy:
invokes the first object manager with the first object of the object hierarchy; and
invokes the second object manager with the second object of the object hierarchy.

11. The method of claim 1, wherein the object manager set comprises an object manager extender that, upon receiving from the process a new object manager that, upon receiving a request from the process specifying the object of the object hierarchy, performs a new action on the object of the object hierarchy, adds the new object manager to the object manager set.

12. The method of claim 2, wherein:
the object hierarchy is exposed to the process according to an object hierarchy location selected from an object hierarchy location set comprising:
a local object hierarchy location for an object hierarchy exposed to the process executing on the computer;
a remote object hierarchy location for an object hierarchy exposed to the process executing on a respective device other than the computer; and
a web object hierarchy location for an object hierarchy exposed by a webserver executing on the computer; and the presenting the object manager set further comprises:
presenting the object manager set to the process irrespective of the location of the object hierarchy.

13. A system that represents a computing environment of a computer according to an access protocol comprising at least one verb that is applicable to respective objects of the computing environment irrespective of respective object type of the respective objects, wherein the system comprises:
a computer processor executing a process; and
a memory storing:
an object manager set of object managers that respectively perform actions to objects of an object type that are accessible within the computing environment, wherein the object manager set comprises:
a file manager that manages files of the computing environment;
an application manager that manages application objects respectively representing an application executable within the computing environment;
a device object representing a device accessible to the computing environment and accessible through a device manager; and
a user profile object representing a user profile of a user of the computing environment and accessible through a user profile manager; and
instructions that, when executed on the computer processor, provide:
a computing environment presenter that presents the computing environment to the process as an object hierarchy of the objects respectively of the object type and managed by an object manager, the computing environment respectively managed by the object manager, wherein the respective objects of the computing environment are identified by a location of the respective objects with the object hierarchy; and
an action provider that, responsive to receiving a request from the process to invoke a selected verb of the access protocol on a selected object identified by a selected object location:
identifies a selected object type of the object located at the selected object location within the object hierarchy;
identifies, from the object manager set, a selected object manager that manages objects of the selected object type;
identifies, for the selected object manager, a selected action that performs the selected verb of the access protocol to the objects of the selected object type; and
invokes the selected object manager to perform the selected action corresponding to the selected verb on the selected object.

14. The system of claim 13, wherein:
the respective objects are identified by an object accessibility selected from an object accessibility set comprising:
a local object accessibility for the object hierarchy that is exposed to the process executing on the computer;
a remote object accessibility for the object exposed to the process executing on a remote device; and
a web object accessibility for the object hierarchy exposed to the process through a web page provided by a webserver; and the respective object managers perform the selected action on the selected object according to a respective object accessibility of the selected object.

15. The system of claim 13, wherein:
the location of the respective objects of the object hierarchy further comprises a uniform resource identifier;
the access protocol further comprises hypertext transport protocol; and
the request further comprises a hypertext transport protocol request specifying the selected verb of the hypertext transport protocol and the uniform resource identifier of the selected object.

16. The system of claim 13, wherein the performing the selected action further comprises: responsive to invoking the selected manager to perform the selected action corresponding to the selected verb on the selected object, refraining from retaining a state of the request.

17. The system of claim 13, wherein:
the respective object managers are associated with an object manager location within the object hierarchy; and
presenting the object manager set to the process comprises:
presenting the respective object managers through a representational state transfer interface that, upon receiving a request specifying the object manager location of the selected object manager and the location of the selected object, applying the service to the object of the object hierarchy identified by the location of the selected object without retaining a state of the request.

18. The system of claim 17, wherein:
the object manager location of the respective object managers of the object manager set further comprises a uniform resource identifier;
the access protocol further comprises hypertext transport protocol; and
the request further comprises a hypertext transport protocol request specifying the uniform resource identifier of the selected object manager, the selected verb of the hypertext transport protocol, and the location of the selected object within the object hierarchy.

19. The system of claim 17, wherein:
the respective objects are identified by an object accessibility selected from an object accessibility set comprising:
a local object accessibility for the object hierarchy that is exposed to the process executing on the computer;
a remote object accessibility for the object exposed to the process executing on a remote device; and
a web object accessibility for the object hierarchy exposed to the process through a web page provided by a webserver; and
the respective object managers apply the selected action to the selected object according to a respective object accessibility of the selected object.

20. A webserver hosting a computing environment, comprising:
a computer processor executing a process; and
a memory storing:
an object hierarchy comprising objects of the computing environment that are respectively identified by a uniform resource identifier and that are accessible through a hypertext transfer protocol verb irrespective of an object type of the respective objects;
an object manager set of object managers that respectively perform actions to the objects of the object type that are accessible within the computing environment, wherein the object manager set comprises:
a file manager that manages files of the computing environment;
an application manager that manages application objects respectively representing an application executable within the computing environment;
a device object representing a device accessible to the computing environment and accessible through a device manager; and
a user profile object representing a user profile of a user of the computing environment and accessible through a user profile manager; and
instructions that, when executed on the computer processor, provide:
an action provider that, responsive to receiving a request from the process to invoke a hypertext transfer protocol verb on a selected object identified by a selected uniform resource identifier:
identifies a selected object type of the selected object identified by the selected uniform resource identifier;
identifies, from the object managers, a selected object manager that manages objects of the selected object type;
identifies, for the selected object manager, a selected action that performs the selected hypertext transfer protocol verb to the objects of the selected object type; and
invokes the selected object manager to perform the selected action corresponding to the selected hypertext transfer protocol verb on the selected object.

* * * * *